United States Patent
Cvijetic et al.

(10) Patent No.: US 9,733,108 B2
(45) Date of Patent: Aug. 15, 2017

(54) METHOD AND APPARATUS FOR REMOTE SENSING USING OPTICAL ORBITAL ANGULAR MOMENTUM (OAM)-BASED SPECTROSCOPY FOR DETECTING LATERAL MOTION OF A REMOTE OBJECT

(71) Applicant: NEC Laboratories America, Inc., Princeton, NJ (US)

(72) Inventors: Neda Cvijetic, San Jose, CA (US); Giovanni Milione, Franklin Sqaure, NY (US); Ezra Ip, Plainsboro, NJ (US); Ting Wang, West Windsor, NJ (US)

(73) Assignee: NEC Corporation, Tokyo (JP)

( * ) Notice: Subject to any disclaimer, the term of this patent is extended or adjusted under 35 U.S.C. 154(b) by 114 days.

(21) Appl. No.: 14/975,252

(22) Filed: Dec. 18, 2015

(65) Prior Publication Data
US 2016/0202090 A1  Jul. 14, 2016

Related U.S. Application Data

(60) Provisional application No. 62/101,051, filed on Jan. 8, 2015, provisional application No. 62/131,555, filed on Mar. 11, 2015.

(51) Int. Cl.
*G01B 11/00* (2006.01)
*G01D 5/34* (2006.01)
(Continued)

(52) U.S. Cl.
CPC .............. *G01D 5/34* (2013.01); *G01B 11/002* (2013.01); *G01S 7/4814* (2013.01); *G01S 17/58* (2013.01);
(Continued)

(58) Field of Classification Search
None
See application file for complete search history.

(56) References Cited

U.S. PATENT DOCUMENTS

| | | | |
|---|---|---|---|
| 8,174,742 B2 * | 5/2012 | Roichman | G03H 1/0005 250/251 |
| 8,977,121 B2 * | 3/2015 | Djordjevic | H04B 10/25 398/43 |
| 9,389,349 B2 * | 7/2016 | Kolchin | G01N 21/9505 |

OTHER PUBLICATIONS

Lavery, M.P.J. et al., "Detection of a spinning object using light's orbital angular momentum," Science Magazine, vol. 341, No. 6145, Aug. 2013. (pp. 1-9).

(Continued)

*Primary Examiner* — Tri Ton
*Assistant Examiner* — Jarreas C Underwood
(74) *Attorney, Agent, or Firm* — Joseph Kolodka

(57) ABSTRACT

A method and system for remote sensing using optical orbital angular momentum (OAM)-based spectroscopy for lateral motion detection. The method includes applying an OAM mode on a light beam to generate an OAM light beam, the OAM light beam having an optical OAM spectrum, applying an OAM optical beam tilt on the OAM light beam to generate a tilted OAM light beam, transmitting the tilted OAM light beam on a remote object, such that the remote object interacts with the tilted OAM light beam, receiving a reflected OAM spectrum associated with the remote object, the reflected OAM spectrum having power values of OAM modes on opposite sides of an OAM launch mode, and displaying lateral motion of the remote object based on the reflected OAM spectrum by comparing the power values.

18 Claims, 10 Drawing Sheets

(51) Int. Cl.
 G01S 17/58 (2006.01)
 G06F 3/03 (2006.01)
 G01S 17/66 (2006.01)
 G01S 7/481 (2006.01)
 G06F 3/01 (2006.01)
(52) U.S. Cl.
 CPC .............. *G01S 17/66* (2013.01); *G06F 3/017* (2013.01); *G06F 3/0304* (2013.01)

(56) References Cited

OTHER PUBLICATIONS

Lavery, M.P.J. et al., "Measurement of the light orbital angular momentum spectrum using an optical geometric transformation," Journal of Optics, vol. 13, No. 6, Apr. 2011. (pp. 1-4).

Lin, J. et al., "Application of orbital angular momentum to simultaneous determination of tilt and lateral displacement of a misaligned laser beam," Journal of the Optical Society of America A, vol. 27, No. 10, Oct. 2010. (pp. 1-7).

Uribe-Patarroyo, N., et al., "Object identification using correlated orbital angular momentum states," Physics Review Letters, vol. 110, No. 4, Jan. 2013. (pp. 1-5).

Vasnetsov, M.V. et al., "Analysis of orbital angular momentum of a misaligned optical beam," New Journal of Physics, vol. 7, Feb. 2005.

\* cited by examiner

METHOD AND APPARATUS FOR REMOTE SENSING USING OPTICAL ORBITAL ANGULAR MOMENTUM (OAM)-BASED SPECTROSCOPY FOR DETECTING LATERAL MOTION OF A REMOTE OBJECT

RELATED APPLICATION INFORMATION

This application claims priority to provisional application Ser. No. 62/101,051 filed on Jan. 8, 2015 and provisional application Ser. No. 62/131,555 filed on Mar. 11, 2015, both of which are incorporated herein by reference.

BACKGROUND

Technical Field

The present invention generally relates to methods and systems for remote sensing using optical angular momentum (OAM)-based spectroscopy. More particularly, the present disclosure is related to remote sensing using optical angular momentum (OAM)-based spectroscopy for detecting lateral motion of a remote object.

Description of the Related Art

Remote sensing is the acquisition of information about an object or phenomenon without making physical contact with the object. In some instances, remote sensing enables collection of data related to a remote object, even when the remote object is located in areas that may be dangerous or inaccessible. Accordingly, remote sensing is vital to an array of important scientific, environmental and social safety and security applications.

Typical remote sensing methods fail to obtain translational motion (e.g., linear movement of an object, lateral movement of an object in a two-dimensional Cartesian plane, etc.) and/or high resolution spatial feature information about the remote object. For example, Light Detection and Range (LIDAR)-based systems, in which employ light intensity to identify distance-based information, uses only time-domain information (e.g., the travel time of an electromagnetic signal directed to and reflected from the remote object) to determine position, while frequency shifts in the detected signal may infer object velocity and direction with respect to a detector (e.g., whether the remote object is moving toward or away from the detector). However, time-domain information does not provide translational motion, such as horizontal and/or vertical motion, of the remote object. Other multi-beam motion and gesture recognition systems require multiple parallel optical beams, and only detect rotational aspects of motion and/or structure, and not translational and/or lateral motion.

The ability to overcome these limitations and perform translational motion detection and/or edge detection would provide advantages to a range of important remote sensing applications, including LIDAR/RADAR-based systems, vehicle surveillance, gesture recognition systems, robotics, infrastructure monitoring, astronomy, etc.

SUMMARY

In one embodiment of the present principles, a transmitter for remote sensing using optical orbital angular momentum (OAM)-based spectroscopy for lateral motion detection is provided. In an embodiment, the transmitter may include a light source modulator configured to generate a light beam for imaging a remote object, at least one OAM generator to apply at least one OAM mode on the light beam to generate an OAM light beam, the OAM light beam having an optical OAM spectrum, and at least one optical beam tilter to apply at least one optical beam tilt on the OAM light beam to generate a tilted OAM light beam, wherein the tilted OAM light beam interacts with the remote object to provide lateral motion associated with the remote object In another embodiment of the present principles, a receiver for remote sensing using optical orbital angular momentum (OAM)-based spectroscopy for lateral motion detection is provided. In an embodiment, the receiver includes at least one optical beam tilter to apply at least one optical beam tilt on an OAM light beam to generate a tilted OAM light beam, the titled OAM light beam having a reflected optical OAM spectrum, at least one OAM detector configured to receive the reflected OAM spectrum associated with a remote object, the reflected OAM spectrum having at least two power values of OAM modes on opposite sides of an OAM launch mode, and a processor to compare the at least two power values to display lateral motion of the remote object based on the reflected OAM spectrum.

In a further embodiment, a method for remote sensing using optical orbital angular momentum (OAM)-based spectroscopy for lateral motion detection is provided. In an embodiment, the method may include applying at least one OAM mode on a light beam to generate an OAM light beam, the OAM light beam having an optical OAM spectrum, applying at least OAM optical beam tilt on the OAM light beam to generate a tilted OAM light beam, transmitting the tilted OAM light beam on a remote object, such that the remote object interacts with the tilted OAM light beam, receiving a reflected OAM spectrum associated with the remote object, the reflected OAM spectrum having at least two power values of OAM modes on opposite sides of an OAM launch mode, and displaying lateral motion of the remote object based on the reflected OAM spectrum by comparing the at least two power values.

These and other features and advantages will become apparent from the following detailed description of illustrative embodiments thereof, which is to be read in connection with the accompanying drawings.

BRIEF DESCRIPTION OF DRAWINGS

The present principles will provide details in the following description of preferred embodiments with reference to the following figures wherein.

DETAILED DESCRIPTION OF PREFERRED EMBODIMENTS

In accordance with the present principles, systems and methods are provided for remote sensing using optical angular momentum (OAM)-based spectroscopy for detecting lateral motion of a remote object. Some of the main challenges in remote sensing applications include providing translational motion, edge detection, and/or high resolution object identification. In one aspect, the methods, systems and computer program products disclosed herein employ optical orbital angular momentum (OAM) on a tilted light beam eclipsed by a moving remote object to obtain lateral motion (e.g., one dimensional motion, two dimensional motion, etc.), edge detection, and high resolution feature identification of structural properties in a remote object during remote sensing.

Generally, orbital angular momentum (OAM) of light is the component of angular momentum of a light beam that is dependent on the field spatial distribution, and not on the polarization (e.g., property of the wave which may oscillate in more than one orientation). The methods and systems described herein provide several advantages including effective compressive imaging (e.g., data compression), which is much more efficient than pixel-by-pixel imaging techniques, with the added advantage of having low computational cost and less complexity.

It should be understood that embodiments described herein may be entirely hardware, or may include both hardware and software elements which includes, but is not limited to, firmware, resident software, microcode, etc.

Figure 1:
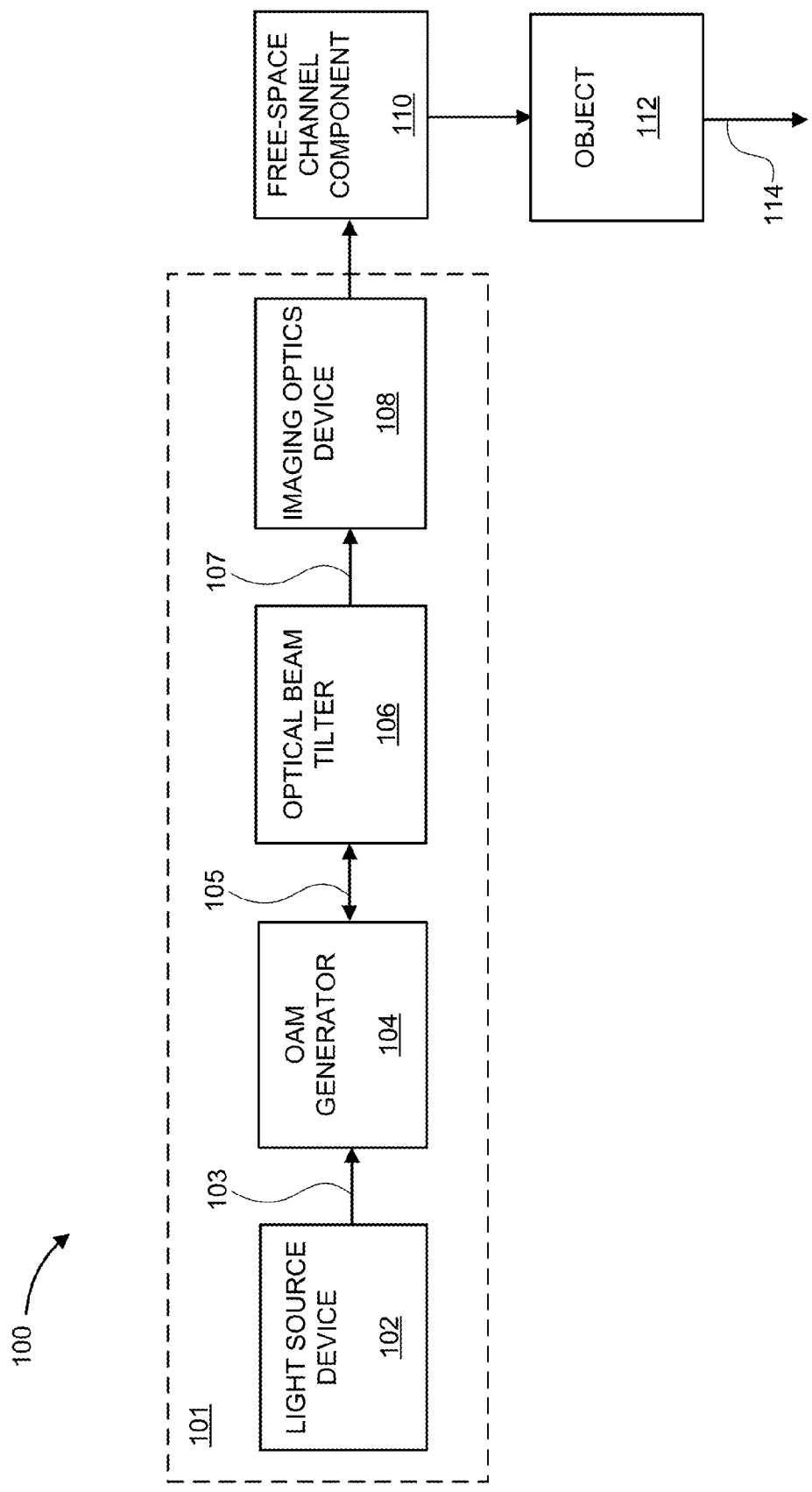
FIG. 1 shows an exemplary system for a transmitter-side remote sensing system using optical orbital angular momentum (OAM)-based spectroscopy for detecting lateral motion of a remote object, in accordance with an embodiment of the present principles.

Referring to the drawings in which like numerals represent the same or similar elements and initially to FIG. 1, a transmitter-side optical OAM-based remote sensing system 100 for detecting translational motion and edge detection of a remote object is illustratively depicted. In one embodiment, the transmitter-side optical OAM-based remote system 100 may include a transmitter 101. The transmitter 101 may include a light source modulator in accordance with at least one OAM state for imaging a remote object, such as at least one light source device 102. The light source device 102 may be configured to transmit a light beam 103 on a remote object 112, the remote object 112 being a non-moving and/or moving object. In some embodiments, the light source device 102 may include a laser beam source having a wavelength of 1550 nanometers, however other wavelengths are contemplated. For illustrative purposes, types of light source devices and/or laser beam sources may include, but are not limited to, vertical-cavity surface-emitting lasers (VCSELs), optical fiber laser, external cavity laser, solid state laser, high coherence light source, supercontinuum light source, quantum cascade laser, etc.

The light beam 103 may intrinsically or extrinsically have angular momentum. For example, intrinsic OAM eigenstates on a light beam may be described by the azimuthal phase factor $\exp(il\phi)$, which may be defined with respect to the z axis of a cylindrical polar coordinate system, also referred to as a beam axis (e.g., the axis in which the light beam propagates). When defined with respect to a reference axis (e.g., x-axis, y-axis) that is normal to an OAM detector plane, superpositions of intrinsic OAM states can be observed due to the emergence of extrinsic OAM. Extrinsic OAM may be associated with changes in the light beam's center of gravity, which in the paraxial approximation is a function of several parameters, including beam tilt (e.g., angular misalignment between the beam and measurement axes), obstruction, and/or waist size. Consequently, when a light beam is tilted and/or obstructed, the light beam's OAM spectrum (e.g., the optical power in each OAM state about the reference axis) changes due to extrinsic OAM.

In paraxial approximation, which is an approximation used in Gaussian optics and ray tracing of light through an optical system (e.g., a lens), the light beam's 103 angular momentum may be separated into two parts, namely spin angular momentum and orbital angular momentum (OAM). The spin angular momentum of light is associated with light's polarization degree of freedom, such as a wave's circular or elliptical polarization. For example, an electromagnetic wave may have circular polarization when its electric and magnetic fields rotate continuously around the axis of the light beam during propagation. In contrast, the orbital angular momentum (OAM) of light is associated with light's spatial degree of freedom.

According to an embodiment of the present principles, the transmitter 101 of the transmitter-side optical OAM-based remote system 100 may include at least one optical OAM generator 104. The OAM generator 104 may configured to receive the light beam 103, as input from the light source device 102, and may generate at least one OAM state on the light beam 103 to generate an OAM light beam 105 and, in a further embodiment, an optical OAM spectrum 114. In an embodiment, the OAM generator 104 may apply OAM states on the light beam to generate an optical OAM spectrum 114 associated with the remote object 112, wherein the optical OAM spectrum 114 provides lateral motion information and/or high resolution imaging information of the remote object 112.

For example, OAM states on light beams may include Bessel light beams, Laguerre-Gaussian light beams, optical fiber modes, superpositions of Bessel light beams or Laguerre-Gaussian light beams that have the same OAM phase number as described below. In particular, light's spatial modes with complex amplitude described by the phase factor $\exp(il\theta)$ are known as its OAM modes, where $l=0, \pm 1, \pm 2, \ldots$, and $\theta$ is the cylindrical coordinate. In one embodiment, the OAM generator 104 may apply arbitrary non-zero ($l \neq 0$) OAM states on the light beam 103 of the light source 102, where l denotes the OAM phase number and/or OAM state number. Light beams that carry non-zero OAM states may be defined as being in a helical mode, which may be characterized by a wave front including a helix shape with an optical vortex in the center at the beam axis. When the OAM state is zero (e.g., l=0), for example, the light beam does not bear OAM, and accordingly is not helical and has a constant phase across the mode. According to the present principles, both the zero (e.g., l=0) and non-zero (e.g., l≠0) OAM modes and cases are supported.

In one embodiment, the optical OAM generator 104 may include a spatial light modulator (SLM), Q-phase plates, an OAM sorter, fiber-optic methods (e.g., generating an OAM mode in an optical fiber), integrated silicon photonics methods without loss of generality, etc. For example, a spatial light modulator (SLM) may include a device configured to impose spatially varying modulation on a beam of light, such as a modulation on the intensity and/or phase of a beam of light. In another example, Q-phase plates may include a liquid crystal cell having a thickness and/or birefringence selected to induce a birefringent phase at the wavelength for light propagation and may be employed to cause, for example, interaction between the spin angular momentum and orbital angular momentum.

In a further embodiment, the transmitter 101 may include an optical beam tilter 106. The optical beam tilter 106 may be configured to tilt the OAM light beam 105, either mechanically or digitally, with respect to a reference axis (e.g., the x-axis). In an embodiment, the optical beam tilter 106 may generate a tilted OAM beam 107. For example, the optical beam tilter 106 may be configured to impose a beam tilt on the OAM light beam 105 by mechanical methods, such as by mechanically creating an angular displacement between the OAM generator 104 and the reference axis. Alternatively, the optical beam tilter 106 may be configured to impose a beam tilt on the OAM light beam 105 by digital methods, such as by digitally programming the OAM generator 104 to generate a titled OAM light beam 107 having a target angular displacement. It should be noted that the optical beam tilter 106 may be imposed at the transmitter-side optical OAM-based remote system 100, or an equivalent optical beam tilter may be imposed at the receiver-side OAM-based remote system, as will described in further detail below.

The transmitter 101 may include at least one imaging optics device 108. In another embodiment, the transmitter-side optical OAM-based remote system 100 includes the at least one imaging optics device 108 such that the imaging optics device is separate and apart from the transmitter 101. For ease of illustration, the at least one imaging optics device 108 is shown as a part of the transmitter 101. As shown in FIG. 1, following the OAM generator 106 and/or optical beam tilter 106, the titled OAM light beam 107 may be applied as input to at least one imaging optics device 108, according to one embodiment. The at least one imaging optics device 108 may include, but is not limited to, a lens, a plurality of lenses arranged in a series, microscope objective(s), or free-space optics, etc., without loss of generality. For example, a microscope objective is an optical element, such as a single lens, mirror, similarly functioning devices or combinations thereof, that may gather light from the object being observed and may focus the light rays to produce a real image. In an embodiment, the at least one imaging optics device 108 may be configured to collimate the light beam to a fixed size, expand the light beam to a larger size, reduce the size of the light beam to a smaller size, or any combination thereof, image an object from a distance such that it is in focus to the detector, and/or image an object from an arbitrary distance such that it is in focus at the detector.

In an embodiment, the titled OAM light beam 107 may be transmitted through a free-space channel component 110 (e.g., a first free-space channel component). The free-space channel component 110 may include, but is not limited to, air, outer space, a vacuum, or similarly functioning components. For example, the tilted OAM light beam 107 may be propagated in free space to transmit data (e.g., wirelessly), such as the case in telecommunications and/or computer networking. In another embodiment, the free-space channel component 110 may include, for example, optical amplifiers configured to send wavelengths of light directly through the atmosphere to another device waiting to receive the information.

As illustrated in FIG. 1, following transmission of the tilted OAM light beam 107 through a free-space channel component 110, the titled OAM light beam 107, having OAM states, may be directed (e.g., shines, interacts, etc.) on a remote object of interest 112 such that the translational motion of the remote object 112 causes partial or complete obstruction of the tilted OAM light beam 107 as the remote object 112 moves (e.g., horizontally and/or vertically). Accordingly, a reflected optical OAM spectrum 114 associated with the remote object 112 may be generated and/or outputted. The OAM spectrum 114, which may include OAM spectra measurements, is a parameter that may be used to characterize the tilted OAM light beam 107 to provide translational motion of the remote object 112.

Accordingly, the translational motion (e.g., lateral motion) of the remote object 112 along the axis perpendicular to both the reference axis (e.g., x-axis) and the beam axis (e.g., axis of beam propagation taken to be the z axis) can be unambiguously determined from the OAM spectra measurements. By changing the reference axis of the tilt of the optical beam (e.g., from the x-axis to the y-axis), translational motion along the new perpendicular axis can be detected. Moreover, using parallel measurements of OAM spectra resulting from light-matter interaction between the remote object 112 and the beam along two orthogonal reference axes, two-dimensional translational motion of the remote object 112 can unambiguously be determined and tracked. The lateral motion detection results apply to remote objects 112 with physical size comparable to or larger than the titled OAM light beam 107 spot size at the location of light-matter interaction (e.g., at the remote object 112). Moreover, by applying translational motion to the tilted OAM light beam (e.g., scanning along the x- or y-axis), the present principles may identify high-resolution structural features (e.g., edges) along the target perpendicular axis/axes in a non-moving remote object.

Figure 2:
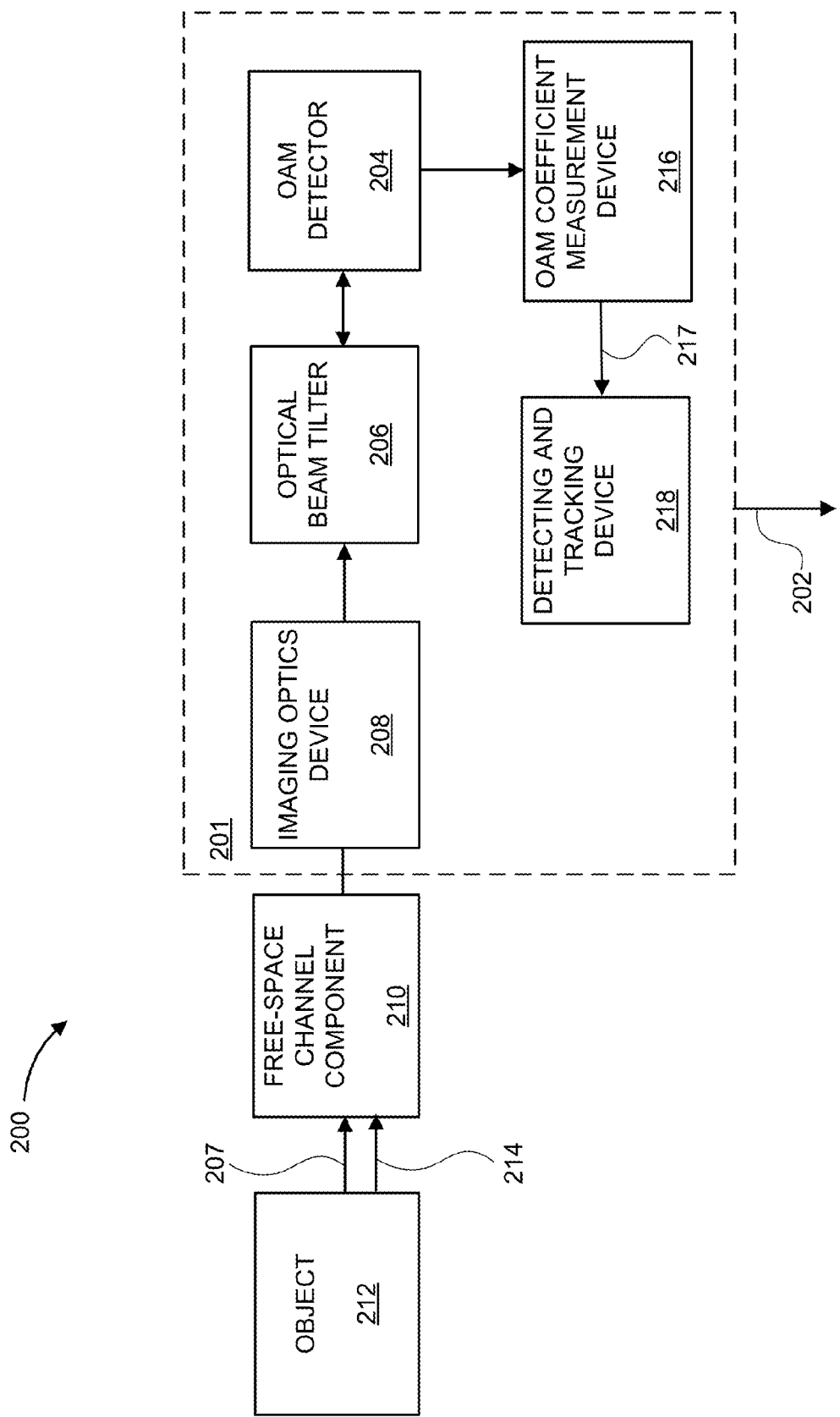
FIG. 2 shows an exemplary system for a receiver-side remote sensing system using optical orbital angular momentum (OAM)-based spectroscopy for detecting lateral motion of a remote object, in accordance with an embodiment of the present principles.

Now referring to FIG. 2, a receiver-side optical OAM-based remote sensing system 200 for remote sensing using optical angular momentum (OAM)-based spectroscopy for detecting lateral motion of a remote object is illustratively depicted. It should be noted that remote object 212 may be the same remote object 112 depicted in FIG. 1, and OAM spectrum 214 may be the same or similar to the OAM spectrum 114 of FIG. 1. The OAM spectrum 214 may be carried by the tilted OAM light beam 207 or, alternatively, the OAM spectrum 214 may be carried by an OAM light beam 207 which has not been previously tilted, which will be described in further detail below.

It should be further noted that the receiver-side optical OAM-based remote sensing system 200 and/or receiver 201 may be implemented in either transmissive or reflective modes. For example, when the receiver-side optical OAM-based remote sensing system 200 of FIG. 2 is implemented in the reflective mode, the tilted OAM light beam 207 and/or OAM spectrum 214 reflected from the remote object 212 travels back through the free-space channel component 110 of FIG. 1 of the transmitter-side optical OAM-based remote sensing system 100 in the reverse direction. In such a scenario, the free-space channel component 210 in FIG. 2 may be identical to the free-space channel component 110 of FIG. 1. Similarly, the imaging optics device 208 in FIG. 2 may be identical to the imaging optics device 108 of FIG. 1. In addition, the optical beam tilter 206 of FIG. 2 may be identical to the optical beam tilter 106 of FIG. 1.

In an embodiment, when the receiver-side optical OAM-based remote sensing system 200 and/or receiver 201 of FIG. 2 is implemented in the reflective mode, the receiver-side components of the receiver 201, namely an OAM detector 204 and/or OAM coefficient measurement device 203 may also be collocated with the transmitter-side components of the transmitter 101 of FIG. 1, namely OAM generator 104. For example, the OAM generator 104 of FIG. 1 may be configured to provide the same or similar functions of the OAM detector 204 of FIG. 2. In addition, the OAM generator 104 of FIG. 1 may be configured to provide the same or similar functions of the OAM coefficient measurement device 203 of FIG. 2. In addition, further embodiments described herein below relating to the receiver 201 of FIG. 2 may be implemented in the transmitter 101 of FIG. 1. Accordingly, when the receiver-side optical OAM-based remote sensing system 200 and/or receiver 201 of FIG. 2 is implemented in the reflective mode, the receiver 201 may be the same as the transmitter 101 of FIG. 1. For ease of illustration, the embodiments of the optical beam tilter 206, the OAM detector 204, and the OAM coefficient measurement device 203 will be described with reference to the receiver 201 implemented in the transmissive mode.

When the receiver-side optical OAM-based remote sensing system 200 and/or receiver 201 is implemented in the transmissive mode, the OAM light beam 207 and/or optical OAM spectrum 214 reflected from the remote object 212, which carries the optical OAM spectrum information, may be transmitted through a second free-space channel component 210. In one embodiment, the second free-space channel component 210 may be different from the free-space channel component 110 in the transmitter-side optical OAM-based remote sensing system 100 of FIG. 1. The second free-space channel 210 may include, for example, air, outer space, a vacuum, or similarly functioning components. In another embodiment, the free-space channel component 210 and/or imaging optics device 208 may include, for example, optical amplifiers configured to send wavelengths of light directly through the atmosphere to another device waiting to receive the information, such as the receiver 201 and/or OAM detector 204.

In an embodiment, the receiver-side optical OAM-based remote sensing system 200 of FIG. 2 includes a receiver 201 configured to receive and/or measure the reflected titled OAM light beam 207 and/or reflected OAM spectrum 214. In a further embodiment, the receiver 201 may be configured to exploit the reflected OAM spectrum 214 for remote sensing, including providing translational motion information and/or object identification information, such as edge detection. For example, the receiver 201 may be configured to provide translational motion information associated with the remote object to a detection and tracking device 202.

With continued reference to FIG. 2, following transmission through the free-space channel component 210, the tilted OAM light beam 207 and/or reflected OAM spectrum 214 may be transmitted through an imaging optics device 208. In one embodiment, the receiver-side optical OAM-based remote system 200 includes the at least one imaging optics device 208 such that the imaging optics device is separate and apart from the receiver 201. In another embodiment, the receiver 201 may include the at least one imaging optics device 208. For ease of illustration, the at least one imaging optics device 208 is shown as a part of the receiver 201.

The receiver 201 may include an optical beam tilter 206 configured to receive the OAM light beam 207 and tilt the OAM light beam 107 to provide a tilted OAM light beam. For example, the optical beam tilter 206 may impose a beam tilt on the OAM light beam 207 when the OAM light beam 207 has not been previously tilted. Alternatively, the optical beam tilter 206 may provide a further beam tilt for an already titled OAM light beam 207. Accordingly, in some embodiments, the OAM light beam 207 may be previously tilted or, in other embodiments, the OAM light beam 207 may not have been previously tilted prior to the optical beam tilter 206. The optical beam tilter 206 may either impose an optical beam tilt to a non-tilted OAM light beam 207 and/or a previously tilted OAM light beam 207 to provide a titled OAM light beam 207. Without loss of generality, the optical beam tilter 206 is configured to impose an optical beam tilt on the OAM light beam 207 to provide a tilted OAM light beam 207, the tilted OAM light beam 207 being reflected from the remote object 212 and carrying the reflected OAM spectrum 214. The optical beam tilter 206, when the OAM light beam 207 is received at the receiver 201, may be configured to tilt the OAM light beam 207, either mechanically or digitally, with respect to the reference axis (e.g., x-axis). In some embodiments, the optical beam tilter 206 may also be configured to direct the tilted OAM light beam 207 to the OAM detector 204.

It should be noted that an optical beam tilt may be imposed onto the OAM detector 204 either by mechanically creating an angular displacement between the OAM detector 204 and the reference axis or by digitally programming the OAM detector 204 (e.g., SLMs) to have a target angular displacement with respect to the reference axis. In an embodiment, the overall target angular displacement of the optical beam is created through beam tilt. As discussed above, optical beam tilt may be provided by the optical beam tilter 206 at the receiver, however optical beam tilt on the OAM light beam 207 may also be provided by the optical beam tilter 106 of FIG. 1 (e.g., either one or both of the optical beam tilters may be employed). When the light beam is tilted and/or obstructed, the light beam's corresponding OAM spectrum (e.g., the optical power in each OAM state) is altered due to extrinsic OAM.

The OAM detector 204, which may include one or more detectors, may be configured to receive the tilted OAM light beam 207 and/or the reflected optical OAM spectrum 214. In an embodiment, the OAM detector 204 may be configured to, in conjunction with the optical beam tilter 206, impose an optical beam tilt on the OAM light beam 207, such as when beam tilt is imposed digitally. The OAM detector 204 may be employed to measure the reflected optical OAM spectrum 214, which may be carried by the tilted OAM light beam 207. For example, the OAM detector 204 may be configured to determine the resulting power of each OAM mode of the reflected OAM spectrum 214.

In an embodiment, the OAM detector 204 may be configured to measure a set of OAM modes associated with the remote object 212. OAM is one basis of spatial modes to describe light's spatial degree of freedom, which in contrast to other bases of spatial modes, such as the LP-modes of an optical fiber waveguide, is associated with an intrinsic property of light, such as its ability to possess a quantized value of OAM per photon. Aside from being able to obtain high resolution information about an object, the OAM modes of a tilted optical beam may also provide translational motion of the remote object 212. In one embodiment, the OAM detector 204 and/or at least one OAM coefficient measurement device 216 may measure the reflected optical OAM spectrum 214 to provide power meter output for each OAM mode.

The receiver-side optical OAM-based remote sensing system 200 and/or receiver 201 may include at least one OAM coefficient measurement device 216. The OAM coefficient measurement device 216 may be configured to determine, measure and/or output coefficient values 217 of the reflected OAM spectrum 214. For example, the OAM coefficient measurement device 216 may measure specific OAM spectrum coefficients whose values are selectively modified by the light-matter interaction between the remote object 212 and the titled OAM light beam 207. In one embodiment, the at least one OAM coefficient measurement device 216 may be configured to extract OAM coefficient values 217 from the reflected optical OAM spectrum 214 measurement relating to at least one of the amplitude value and relative phase value of each OAM mode and/or amount of power present in each OAM mode. In another embodiment, the coefficient values 217 may include a measurement of the light power of each OAM mode that makes up an object image, a measurement of the light power of one OAM mode of interest, a simultaneous measurement of the light power of multiple OAM modes of interest, a filtering of all OAM modes except the OAM mode of interest such that the coefficient is then the light power of that OAM mode. In a further embodiment, the OAM detector 204 and/or OAM coefficient measurement device 216 may provide the determined power coefficient values residing in specific OAM modes l as input to the detection and tracking device 218.

The detection and tracking device 218 may be configured to receive the power output for each OAM mode and determine the resulting power difference between two OAM modes nearest to the launch OAM state to provide translational motion information and/or edge detection information of the remote object 212 without reconstructing an image of the remote object 212. For example, the detection and tracking device 218, which may include a processor, may detect and/or determine translational motion of the remote object 212 along the axis that is perpendicular both to the direction of beam propagation (e.g., beam axis) and the axis of beam tilt (e.g., reference axis) based on the power coefficient values (e.g., OAM modes l).

When an OAM light beam 207 is tilted and/or obstructed by, for example, a moving remote object 212, the reflected OAM spectrum 214 and corresponding OAM spectra (e.g., the optical power in each OAM mode) changes. For example, if the beam propagates along the z-axis, and the tilt is along the x-axis, the translational motion (e.g., lateral motion) information along the y-axis can be determined and/or tracked. Similarly, if the beam propagates along the z-axis, and the tilt is along the y-axis, the translational motion information along the x-axis can be determined and/or tracked. The detecting and tracking device 218 may be configured to analyze the change in OAM of the tilted OAM light beam 207 and/or the reflected OAM spectrum 214 eclipsed by the moving remote object 212 to provide lateral motion information 202 of the remote object 212 without object image reconstruction.

The present principles enables determining and/or mapping the beam obstruction caused by the remote object's 212 translational motion along the axis perpendicular to both the beam propagation axis and the reference axis (e.g., the axis with respect to which the beam is tilted). In other words, the reflected OAM spectrum 214 that is generated through the light-matter interaction between the tilted OAM light beam 207 and the moving remote object 212 is used to map the lateral motion of the remote object 212 along the target perpendicular axis.

For example, if the optical beam tilt is imposed with respect to the x-axis and the beam travels along the z-axis, the detection and tracking device 218 may determine translational motion along the y-axis (e.g., a remote object moving from top to bottom versus from bottom to top) based on the difference between OAM spectra created when an incoming moving object 212 obstructs the titled OAM beam 207 from the top versus when the remote object 212 obstructs the tilted OAM beam 207 from the bottom. Similarly, if the optical beam tilt is imposed with respect to the y-axis and the tilted OAM beam 207 travels along the z-axis, the detection and tracking device 218 may determine translational motion along the x-axis (e.g., a remote object moving from left to right versus from right to left) based on the difference between OAM spectra provided when an incoming moving object 212 obstructs the tilted OAM light beam 207 from the left versus when the remote object 212 obstructs the tilted OAM light beam 207 from the right. If an optical tilt is imposed with reference to both the x- and y-axes and the tilted OAM light beam 207 propagates along the z-axis, two-dimensional motion tracking along the target perpendicular axes (e.g., y- and x-axes, respectively) may be determined by the detecting and tracking device 218.

To further describe the operation of the OAM detector 204, the OAM coefficient measurement device 216, and the detection and tracking device 218, it should be noted that OAM modes can be represented by Laguerre-Gaussian modes, such as solutions to Maxwell's scalar wave equation in cylindrical coordinates, given by the following equation:

$$LG_{l,p}(r, \theta) = \left(\frac{r\sqrt{2}}{w}\right)^{|l|} \exp\left(-\frac{r^2}{w^2}\right) L_p^{|l|}\left(\frac{2r^2}{w^2}\right) \exp(il\theta) \quad (1)$$

where $(r, \theta)$ are cylindrical coordinates, w is the light beam's waist size, $L_p^{|l|}$ is the Laguerre polynomial for p=(0, 1, 2, ... ), p is the index of the r coordinate of $(r, \theta)$, and l is the index of the theta coordinate of $(r, \theta)$. Thus, p and l are indices that come from the solutions to the wave equation.

Similar to other basis of spatial modes, such as the LP-modes (e.g., modes of optical fibers with radially symmetric index profiles) of an optical fiber waveguide, OAM modes form a complete, orthogonal, and infinite dimensional basis. Therefore, an arbitrary light field, $u(r, \theta)$, such as the image of an object, may be mathematically represented as a superposition of OAM modes. This is referred to as an OAM spectrum, which, using a Laguerre-Gaussian mode representation of OAM modes, may be given by the equation:

$$u(r, \theta) = \sum_{p=0}^{p=+\infty} \sum_{l=-\infty}^{l=+\infty} a_{l,p} LG_{l,p}(r, \theta), \quad (2)$$

$$a_{l,p} = \frac{1}{\sqrt{2\pi}} \int_0^{2\pi} \int_0^r u(r, \theta)(LG_{l,p}(r, \theta))^* r dr d\theta, \quad (3)$$

-continued $$\sum_{l=-\infty}^{l=+\infty} |a_{l,p}|^2 = 1, \quad (4)$$

where $a_{l,p}(r)$ are complex coefficients describing the amplitude and relative phase of each OAM mode in the superposition. In some embodiments, when ignoring the "p" index for simplicity, Equations (2), (3) and (4) may be rewritten as:

$$u(r, \theta) = \sum_{l=-\infty}^{l=+\infty} a_l(r)\exp(il\theta), \quad (5)$$

$$a_l(r) = \frac{1}{\sqrt{2\pi}} \int_0^{2\pi} u(r, \theta)\exp(-il\theta)d\theta, \quad (6)$$

$$\sum_{l=-\infty}^{l=+\infty} |a_l(r)|^2 = 1, \quad (7)$$

where $a_l(r) = \Sigma_{p=0}^{p=\infty} a_{l,p} L_p^{|l|}(2r^2/w^2)$ and the term $|a_l(r)|^2$ describes the amount of power in each OAM mode comprising $u(r, \theta)$. It should be noted that measuring the full OAM mode spectrum may provide a full set of complex coefficients, $a_l(r)$, which may be employed as input in the detecting and tracking device 218 to provide translational motion information 202 of the remote object 210. In an embodiment, the OAM detector 204 and/or the OAM coefficient measurement device 216 of FIG. may provide coefficient values 217, such as $a_l(r)$.

In an embodiment, when an OAM light beam 207 and/or OAM spectrum 214 associated with the OAM light beam 207 is tilted and obstructed by a moving remote object 212, the asymmetry of OAM spectra about the launch OAM state may be used to determine lateral motion that is not coplanar with the beam axis and the measurement axis. If the lateral motion axis (e.g., direction of lateral motion of the remote object) is not coplanar with the beam axis and the measurement axis, asymmetric broadening of the reflected OAM spectrum 214 occurs about the OAM launch state (e.g., l=0). In an embodiment, the OAM spectra forms at least one skew line pair with both the beam axis and the measurement axis. Accordingly, the asymmetric OAM spectrum may depend on the direction of the remote object's 212 lateral motion.

The detecting and tracking device 218 may be configured to analyze the resulting OAM spectral asymmetry to determine the direction of the lateral motion of the remote object 212. For example, the detecting and tracking device 218 may be configured to measure the power difference between at least two OAM states on either side (e.g., l=+1, l=−1) of the launch state (e.g., l=0). For example, for a Gaussian beam, the power difference may be measured by determining the ratio R between the power $P_l$ in the l=+1 state and l=−1 state according to the following formula:

$$R = 10 \log_{10}(P_{+1}/P_{-1}) = 10 \log_{10}(P_{+1}) - 10 \log_{10}(P_{-1}), \quad (8)$$

where R is defined in units of decibels (dB). Accordingly, by determining the ratio R, the detecting and tracking device 218 may be used to provide the motion direction of the remote object 212. In a further embodiment, the detecting and tracking device 218 may also be configured to provide the lateral velocity of the remote object 212 by measuring the power ratio R as a function of time. Compared to Doppler velocimetry, the present principles employ a single light beam to determine presence of and direction of the remote object even when the remote object is not moving. Accordingly, the present principles provide a more computationally efficient system, especially compared to camera-based machine vision systems.

The present principles may be provided in various systems including, but not limited to autonomous vehicles, LIDAR systems, optical mouse for computers, gesture recognition systems, infrastructure monitoring systems and/or devices used in conjunction with astronomy. One of the several advantages of the present principles may include detecting and/or providing horizontal and/or vertical motion (e.g., lateral motion) of a remote object using a single light beam. According to the present principles, the power of each OAM mode is provided by the OAM spectrum, which may include a number of measurements (e.g., OAM spectra), the OAM spectra having fewer measurements than typically needed with conventional cameras. Because the present principles detect only the OAM modes, pixel-by-pixel processing used in conjunction with cameras is avoided, thereby resulting in faster processing and reduced computational cost while also reducing hardware complexity and footprint.

Figure 3:
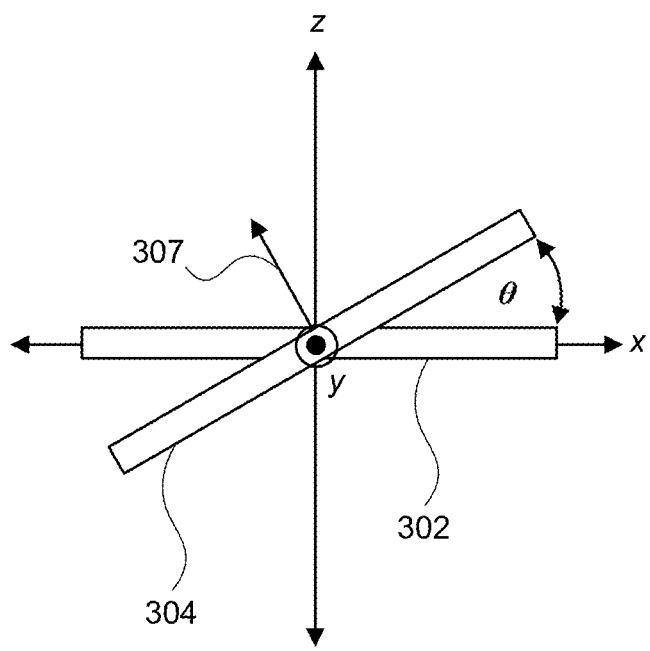
FIG. 3 shows an exemplary system for remote sensing using optical orbital angular momentum (OAM)-based spectroscopy for detecting lateral motion of a remote object, in accordance with an embodiment of the present principles.

Now referring to FIG. 3, an exemplary optical OAM-based remote sensing system 300 with optical beam tilt provided by mechanical displacement of an OAM generator and/or OAM detector 304 is illustratively depicted. As described above, the optical beam tilter 106 of FIG. 1 and/or optical beam tilter 206 of FIG. 2 may provide the mechanical displacement to the OAM generator and/or OAM detector 302 to provide a tilted OAM generator and/or OAM detector 304. The mechanical displacement may be an optical beam tilt provided by angle displacement θ with respect to a reference axis (e.g., x-axis). In accordance with the presence principles, the tilted OAM generator and/or OAM detector 304 may generate a tilted OAM light beam 307 along the optical beam axis (e.g., z-axis) directed towards a remote object 312. By tilting the beam as shown in FIG. 3, the OAM spectra created through light-matter interaction between the tilted OAM light beam 307 and the remote object 312 become unambiguously sensitive to lateral motion of the remote object 312 along the y-axis. By tilting the optical OAM beam by angle θ with respect to the y-axis, the OAM spectra created through light-matter interaction between the tilted OAM light beam 307 and the remote object 312 become unambiguously sensitive to translational motion of the object along the x-axis. Accordingly, tilting two different OAM detectors with respect to two orthogonal axes (e.g., one with respect to the x-axis, and the other with respect to the y-axis) enables two-dimensional lateral motion detection in the x-y plane. It should be noted that if the angle of the tilt along the reference axis/axes is changed from θ to −θ, lateral motion tracking may still be determine, however, the results obtained for a tilt of −θ will be reversed with respect to those obtained for a tilt of θ.

Figure 4:
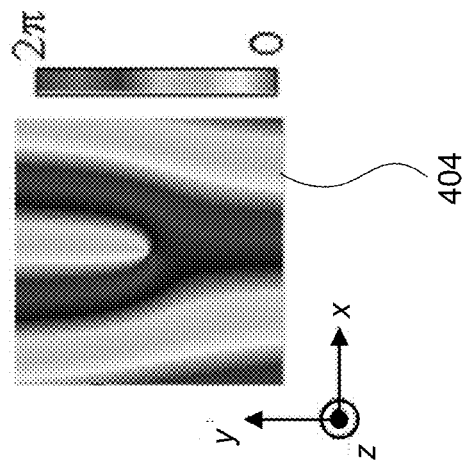
FIG. 4 shows an exemplary system for remote sensing using optical orbital angular momentum (OAM)-based spectroscopy for detecting lateral motion of a remote object, in accordance with an embodiment of the present principles.
Figure 4:
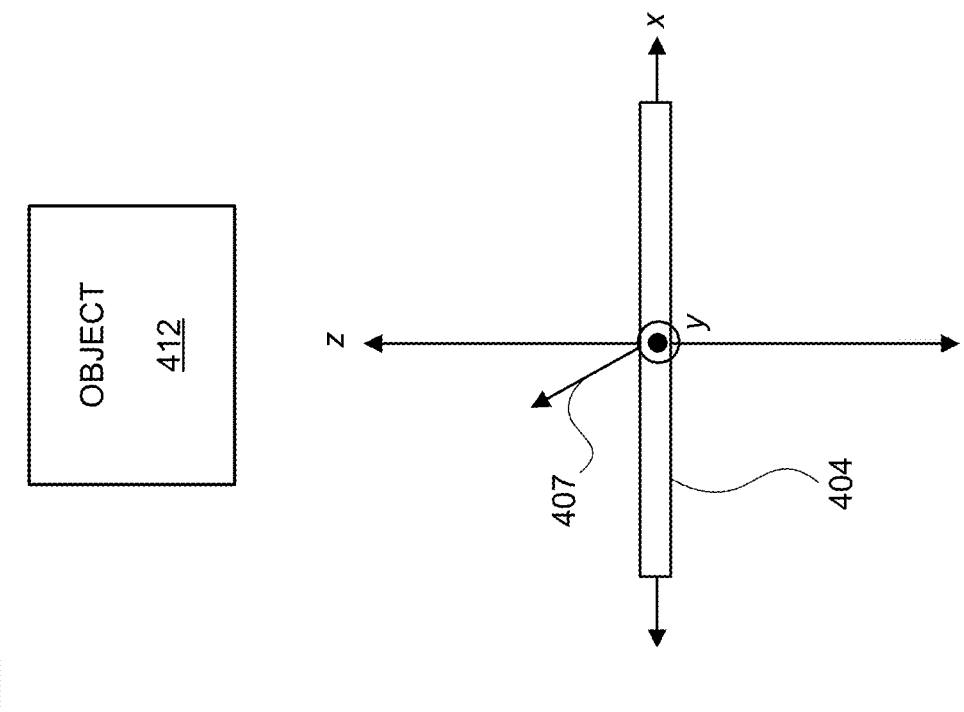

Now referring to FIG. 4, an exemplary optical OAM-based remote sensing system 400 with optical beam tilt provided by digital programing of an OAM generator and/or OAM detector 404 is illustratively depicted. As described above, the optical beam tilter 106 of FIG. 1 and/or optical beam tilter 206 of FIG. 2 may digitally program the OAM generator and/or OAM detector 404 to provide a tilted OAM light beam 407. For example, the titled OAM light beam 407 may be provided by digitally programming the OAM generator and/or OAM detector 404 such that the SLM element and/or spatial phase mask profile of the OAM generator and/or OAM detector 404 features an angle θ with respect to a reference axis (e.g., the x-axis). As shown in FIG. 4, no mechanical displacement has been imposed onto the OAM generator and/or OAM detector 404 with respect to the reference axis.

By digitally tilting the optical beam, as shown in FIG. 4, the OAM spectra created through light-matter interaction between the tilted OAM beam 407 and the remote object 412 become unambiguously sensitive to translational motion of the remote object 412 along the y-axis. By digitally tilting the optical OAM beam by an angle θ with respect to the y-axis, the OAM spectra created through light-matter interaction between the tilted OAM light beam 407 and the remote object 412 become unambiguously sensitive to translational motion of the object along the x-axis. It should be noted that the digital optical beam tilt may offer a higher degree of precision, flexibility, and control of the angle θ, particularly if the tilt is imposed at the receiver end (e.g., at the OAM detector) of the optical OAM-based remote sensing system 400. Moreover, digitally tilting two different OAM detectors with respect to two orthogonal axes (e.g., one with respect to the x-axis, and the other with respect to the y-axis) enables two-dimensional lateral motion detection in the x-y plane.

Figure 5:
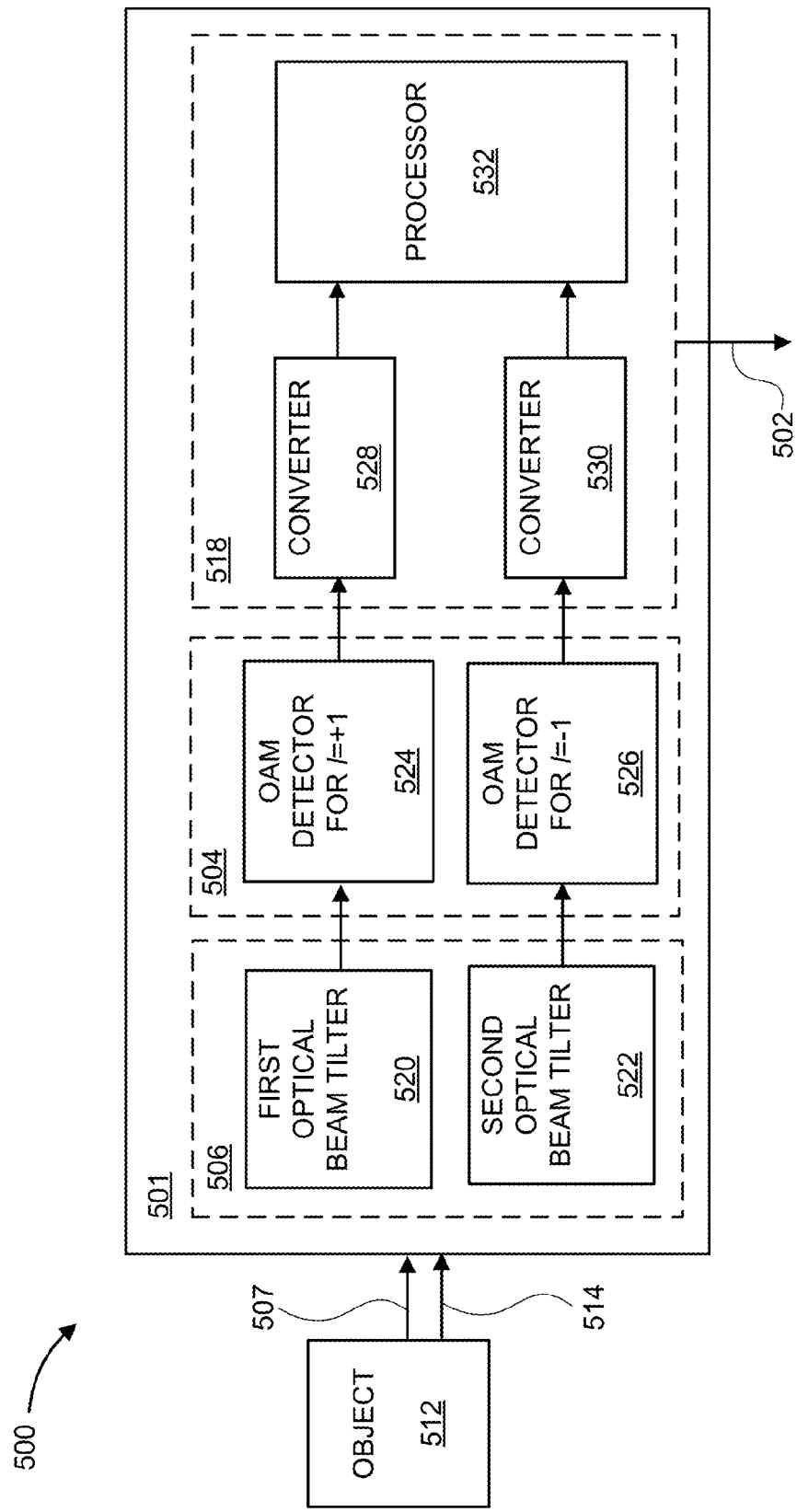
FIG. 5 shows an exemplary system for remote sensing using optical orbital angular momentum (OAM)-based spectroscopy for detecting one-dimensional lateral motion of a remote object, in accordance with an embodiment of the present principles.

Now referring to FIG. 5, an exemplary optical OAM-based remote sensing system 500 for one-dimensional motion detection and tracking along a single reference axis is illustratively depicted. While the OAM-based remote sensing system 500 includes a receiver 501, it should be noted that the features of the receiver 501 described in FIG. 5 may also be applied to elements in a transmitter operating in the reflective mode. When the transmitter operates in the reflective mode, the OAM generator provides the same and/or similar functions of the OAM detector. For ease of illustration, FIG. 5 will now be described with reference to the system 500 acting as a receiver 501. The receiver 501 may be configured to receive a reflected OAM light beam 507 and/or reflected OAM spectrum 514 associated with the remote object 512. The receiver 501 may include an optical beam tilter 506, an OAM detector 504, and a detecting and tracking device 518. The detecting and tracking device 518 may be configured to provide translational motion information 502 associated with the remote object 512.

As shown in FIG. 5, the optical beam tilter 506 may include a plurality of beam tilters, including a first optical beam tilter 520 and a second optical beam tilter 522. The first and second beam tilter 520, 522 may be configured to tilt the OAM light beam 507 with respect to a common reference axis (e.g., x-axis or y-axis) to provide a tilted OAM light beam 507 carrying a reflected OAM spectrum 514. The tilted OAM light beam 507 may be applied to two parallel OAM detectors, namely an OAM detector for l=+1 OAM mode 524 and an OAM detector for l=−1 OAM mode 526. While only two OAM detectors are illustratively depicted, additional OAM detectors are contemplated. OAM detector 524 may be configured to detect OAM mode l=+1 in the reflected OAM spectrum 514, while OAM detector 526 may be configured to detect OAM mode l=−1. Such configuration may be achieved by using, for example, two SLM modulators as OAM detectors and programming the spatial phase masks of the SLM to match the spatial phase pattern for modes l=+1 and l=−1, respectively, without loss of generality.

The output of the OAM detectors 524, 526 may be applied as input to a detecting and tracking device 518. The detecting and tracking device 218 may include a plurality of converters 528, 530 and at least a processor 532. In an embodiment, the outputs of the parallel OAM detectors 524, 526 may be applied as input to two parallel converters 528, 530. The converters 528, 530 may be configured to convert the OAM spectra into power output values for each OAM mode. For example, each of the converters may include a single mode fiber (SMF) and a photodiode (PD). A spatial phase mask of the SLM will match the spatial phase pattern for an OAM mode for a given l value. Then, only that OAM mode will pass into the input of an SMF. When connecting a PD to the output of the SMF, the power that is detected by the PD will be the power of that OAM mode (e.g., its OAM mode coefficient). The outputs of the converters 528, 530 may include power values associated with modes l=+1 and l=−1. In a further embodiment, the detecting and tracking device 518 may include a processor 532 configured to compare the ratio of power values in modes l=+1 and l=−1 with reference values that correspond to those observed in a non-obstructed beam. The reference values for a non-obstructed beam may be determined prior to determining lateral motion of a moving remote object, as will be described in further detail below. Based on this comparison, the detecting and tracking device 518 may provide translational motion information 502 and/or map the obstruction caused by the remote object 512 to one-dimensional translational motion along the target perpendicular axis.

Figure 6:
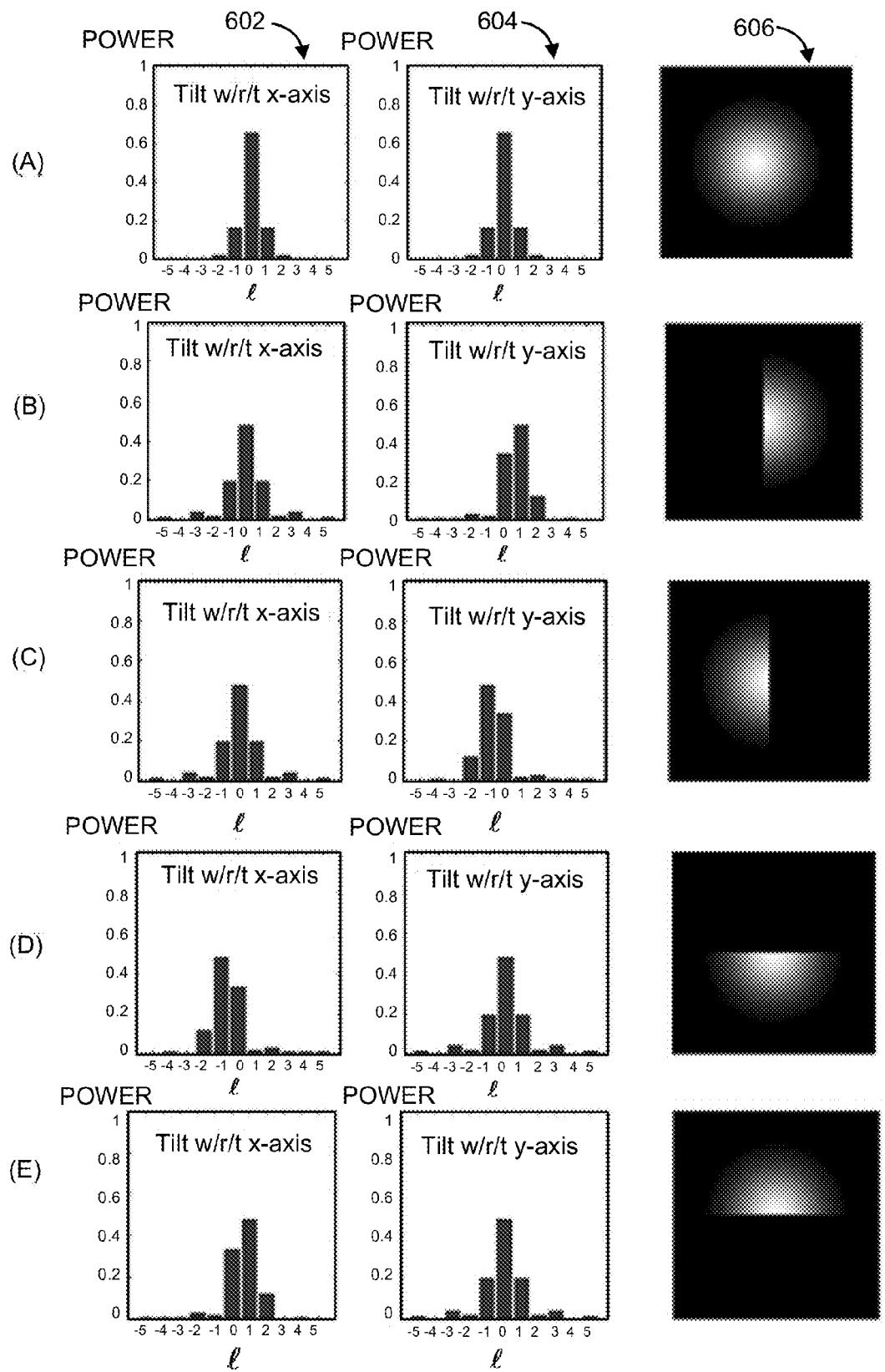
FIG. 6 shows exemplary OAM spectrums and beam intensity profiles associated with a remote object, in accordance with an embodiment of the present principles.

Now referring to FIG. 6, with continued reference to FIG. 5, an illustrative example of OAM spectrums detected by the OAM detectors 524, 526 are illustrated for one-dimensional motion. In FIG. 6, an OAM spectra is provided by the OAM detectors 524, 526 with an optical beam tilt with respect to the x-axis 602 and an optical beam tilt with respect to the y-axis 604. Accordingly, the OAM spectrums with an optical beam tilt with respect to the x-axis are shown in column 602 and the OAM spectrums with an optical beam tilt with respect to the y-axis are shown in column 604. In column 606, the beam intensity profiles indicating the lateral motion of the remote object are shown.

For comparison purposes, example (A) illustrates the OAM spectra measured by the OAM detectors for a launched Gaussian beam with l=0 (e.g., no OAM mode), an optical tilt applied to the OAM detectors with respect to the x-axis 602, and an optical tilt applied to the OAM detectors with respect to the y-axis 604, when no remote object is obstructing the tilted OAM light beam. As shown in example (A), regardless of the optical tilt reference axis (e.g., x versus y), the OAM spectra 602, 604 are identical, exhibiting the same power value for modes l=1 and l=−1, such that the ratio of these two values is unity. The results of example (A) may be used, according to one embodiment, by the detection and tracking device 518 as the reference case for a stationary, non-moving remote object.

In FIG. 6, example (B) provides lateral motion information for a remote object exhibiting lateral motion along the x-axis in a left-to-right fashion. If the OAM detectors 524, 526 are tilted with respect to the x-axis, no change in the resulting OAM spectrum is observed with respect to the reference case, since the ratio between the power values in modes l=1 and l=−1 remains at unity. However, when the OAM detectors 524, 526 are tilted with respect to the y-axis, the ratio between the power values in modes l=1 and l=−1 changes by an order of magnitude, since the power in mode l=1 notably increases while the power in mode l=−1 notably decreases compared to the reference case of example (A). Consequently, in an embodiment, if the ratio of power values in modes l=1 and l=−1 notably increases in favor of l=1 and the OAM detectors are tilted with respect to the y-axis, the detecting and tracking device maps this change in OAM spectra to left-to-right lateral motion of a remote object obstructing the beam along the x-axis.

Example (C) illustrates a remote object exhibiting lateral motion along the x-axis in a right-to-left fashion. When the OAM detectors are tilted with respect to the x-axis, no change in the resulting OAM spectrum is observed with respect to the reference case, since the ratio between the power values in modes l=1 and l=−1 remains in unity. However, when the OAM detectors are tilted with respect to the y-axis, the ratio between the power values in modes l=−1 and l=1 changes by an order of magnitude, since the power in mode l=−1 notably increases while the power in mode l=1 notably decreases compared to the reference case of example (A). Consequently, when the ratio of power values in modes l=−1 and l=1 notably increases in favor of l=−1 and the OAM detectors are tilted with respect to the y-axis, the detecting and tracking device may map this change in OAM spectra to right-to-left translational motion of a remote object obstructing the beam. Comparing the results of example (B) and (C), it is observed that in (B), the power in l=1 increases and the power in l=−1 decreases, while the exact opposite occurs in example (C). Consequently, the two examples can readily be distinguished, such that the detecting and tracking device may discriminate the direction of translational motion along the x-axis.

In example (D), a remote object exhibiting translational motion along the y-axis in a top-to-bottom fashion (e.g., left to right along the y-axis) is illustrated. When the OAM detectors are tilted with respect to the x-axis, the ratio between the power values in modes l=−1 and l=1 changes by an order of magnitude, since the power in mode l=−1 notably increases while the power in mode l=1 notably decreases compared to the reference case of example (A). However, when the OAM detectors are tilted with respect to the y-axis, no change in the resulting OAM spectrum is observed with respect to the reference case, since the ratio between the power values in modes l=−1 and l=1 remains in unity. Consequently, when the ratio of power values in modes l=−1 and l=1 notably increases in favor of l=−1 and the OAM detectors are tilted with respect to the x-axis, the detecting and tracking device may map this change in OAM spectra to top-to-bottom lateral motion of a remote object obstructing the beam.

In example (E), a remote object exhibiting translational motion along the y-axis in a bottom-to-top fashion (e.g., right to left along the y-axis) is illustrated. When the OAM detectors are tilted with respect to the x-axis, the ratio between the power values in modes l=1 and l=−1 changes by an order of magnitude, since the power in mode l=1 notably increases while the power in mode l=−1 notably decreases compared to the reference case of example (A). However, when the OAM detectors are tilted with respect to the y-axis, no change in the resulting OAM spectrum is observed with respect to the reference case, since the ratio between the power values in modes l=1 and l=−1 remains in unity. Consequently, when the ratio of power values in modes l=1 and l=−1 notably increases in favor of l=1 and the OAM detectors are tilted with respect to the x-axis, the detecting and tracking device may map this change in OAM spectra to bottom-to-top fashion lateral motion of a remote object obstructing the beam.

Figure 7:
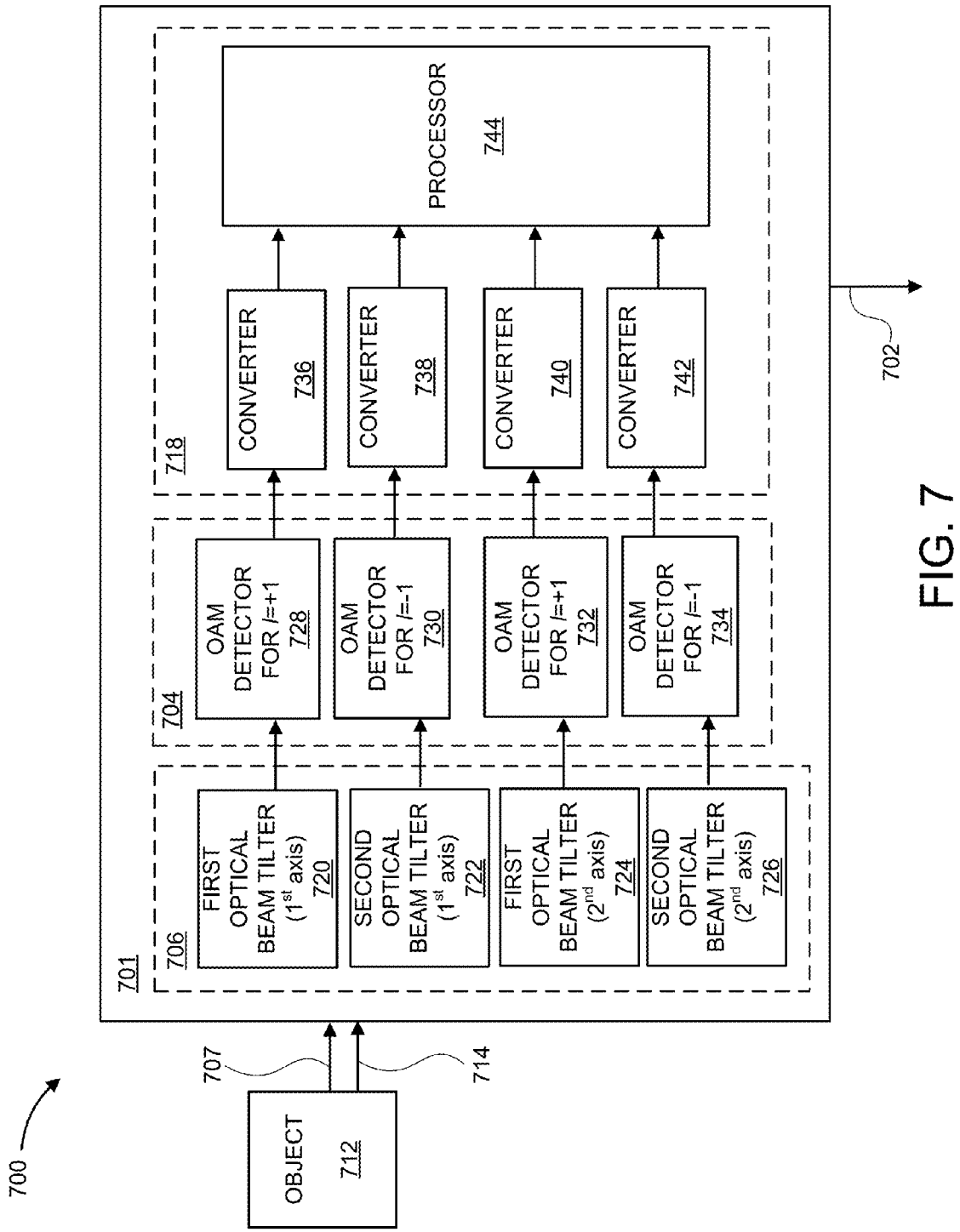
FIG. 7 shows an exemplary system for remote sensing using optical orbital angular momentum (OAM)-based spectroscopy for detecting two-dimensional lateral motion of a remote object, in accordance with an embodiment of the present principles.

Now referring to FIG. 7, an exemplary optical OAM-based remote sensing system 700 for two-dimensional motion detection and tracking along a first reference axis (e.g., $1^{st}$ axis) and a second reference axis (e.g., $2^{nd}$ axis) is illustratively depicted. For ease of illustration, FIG. 7 will now be described with reference to the system 700 acting as a receiver 701, however it should be noted that system 700 may operate as a transmitter operating in a reflective mode.

In an embodiment, the OAM detector 704 may include four parallel OAM detectors 728-734 configured to receive a tilted OAM light beam 707 and/or reflected OAM spectrum 714 associated with the remote object 712. For example, the optical beam tilter 706 may include a first optical beam tilter with respect to a first axis 720, a second optical beam tilter with respect to the first axis 722, a first optical beam tilter with respect to a second axis 724, and a second optical beam tilter with respect to the second axis 726.

As shown in FIG. 7, an optical beam tilter 720, 722 with respect to a first reference axis may be applied to two parallel OAM detectors 728, 730, respectively, and the same amount of optical beam tilt with respect to a second reference axis may be provided by an optical beam tilter 724, 726 and may be applied to two other parallel OAM detectors, 732, 734, respectively. The first reference axis (e.g., $1^{st}$ axis) may be orthogonal to the second reference axis (e.g., $2^{nd}$ axis). For example, OAM detectors 728, 730 may be tilted with reference to the y-axis (e.g., first reference axis), while OAM detectors 732, 734 may be tilted with respect to the x-axis (e.g., second reference axis), without loss of generality. The OAM detectors 728, 732 are configured to detect OAM mode l=1, while OAM detectors 730, 734 are configured to detect OAM mode l=−1.

The outputs of the parallel OAM detectors 728-734 may be directed to four parallel converters 736-742, each of which may include a plurality of parallel single mode fibers (SMF) and photodiodes (PD), as illustrated in FIG. 7. The outputs of the converters 736-742 may include power values associated with modes l=1 and l=−1 with respect to the first and second reference axes. The processor 744 may be configured to compare the ratio of power values in modes l=1 and l=−1 with values that correspond to ratios observed in a non-obstructed beam and, based on this comparison, map the obstruction caused by the remote object 712 to two-dimensional translational motion of the remote object 712. Based on this comparison, the detecting and tracking device 718 may provide translational motion information 702 and/or map the obstruction caused by the remote object 712 to two-dimensional translational motion.

Figure 8:
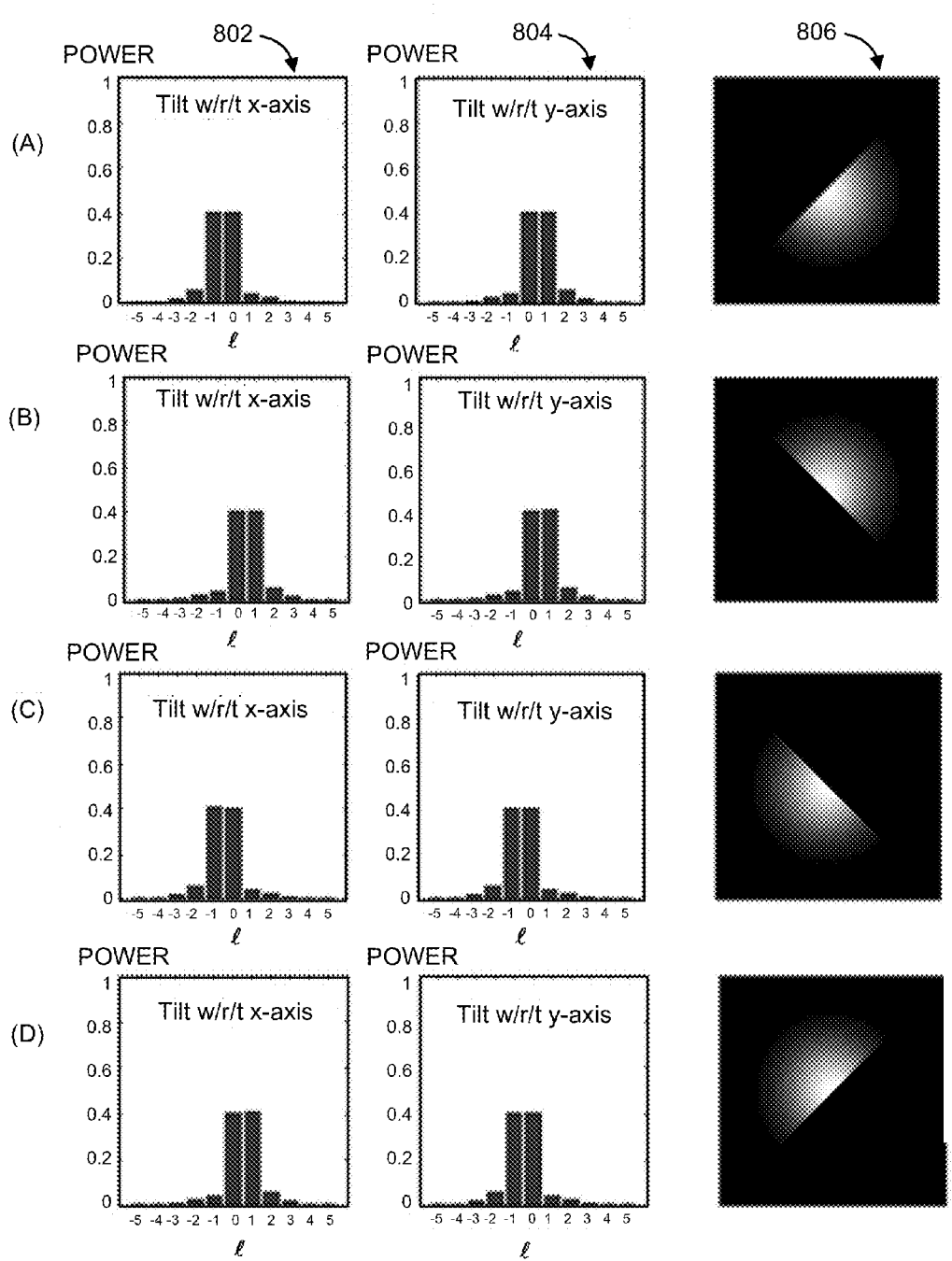
FIG. 8 shows exemplary OAM spectrums and beam intensity profiles associated with a remote object, in accordance with an embodiment of the present principles.

Now referring to FIG. 8, with continued reference to FIG. 7, an illustrative example of OAM spectrum detected by the OAM detectors 728-734 are illustrated for two-dimensional motion. In FIG. 8, an OAM spectra 802 is provided by the OAM detectors 728, 730 with an optical beam tilt with respect to the x-axis and an OAM spectra 804 is provided by the OAM detectors 732, 734 with an optical beam tilt with respect to the y-axis. In column 806, the beam intensity profiles corresponding to the lateral motion of the remote object is shown.

In example (A), a beam obstruction from the top left corner, as shown in the beam intensity profile 806, indicates motion of a remote object left-to-right along the x-axis and left-to-right along the y-axis (e.g., top to bottom). Accordingly, the OAM spectra 802 of OAM detectors 728, 730 illustrate a power value ratio increasing in favor of l=−1, which may be mapped by the detecting and tracking device 718 to top-to-bottom motion, while the OAM spectra 804 of OAM detectors 732, 734 show a power value ratio increasing in favor of l=1, which may be mapped by the detecting and tracking device 718 to left-to-right motion.

In example (B), a beam obstruction from the bottom left corner, as shown in the beam intensity profile 806, indicates motion of a remote object left-to-right along the x-axis and bottom-to-top. The OAM spectra 802 of OAM detectors 728, 730 shows a power value ratio increasing in favor of l=1, which may be mapped to bottom-to-top motion, while the OAM spectra 804 of OAM detectors 732, 734 shows a power value ratio increasing in favor of l=1, which is mapped to left-to-right motion.

In example (C), beam obstruction from the top right corner, corresponding to right-to-left and top-to-bottom motion of a remote object is illustratively depicted according to the beam intensity profile 806. The OAM spectra 802 from the output of OAM detectors 728, 730 shows a power value ratio increasing in favor of l=−1, which is mapped to top-to-bottom motion, while the OAM spectra 804 of OAM detectors 732, 734 shows a power value ratio increasing in favor of l=−1, which is mapped to right-to-left motion.

In example D, beam obstruction from the bottom right corner, corresponding to right-to-left and bottom-to-top motion of a remote object, is illustrated in the beam intensity profile 806. The OAM spectra 802 from the output of OAM detectors 728, 730 shows a power value ratio increasing in favor of l=1, which is mapped to bottom-to-top motion, while the OAM spectra 804 of OAM detectors 732, 734 shows a power value ratio increasing in favor of l=−1, which is mapped to right-to-left horizontal motion.

Figure 9:
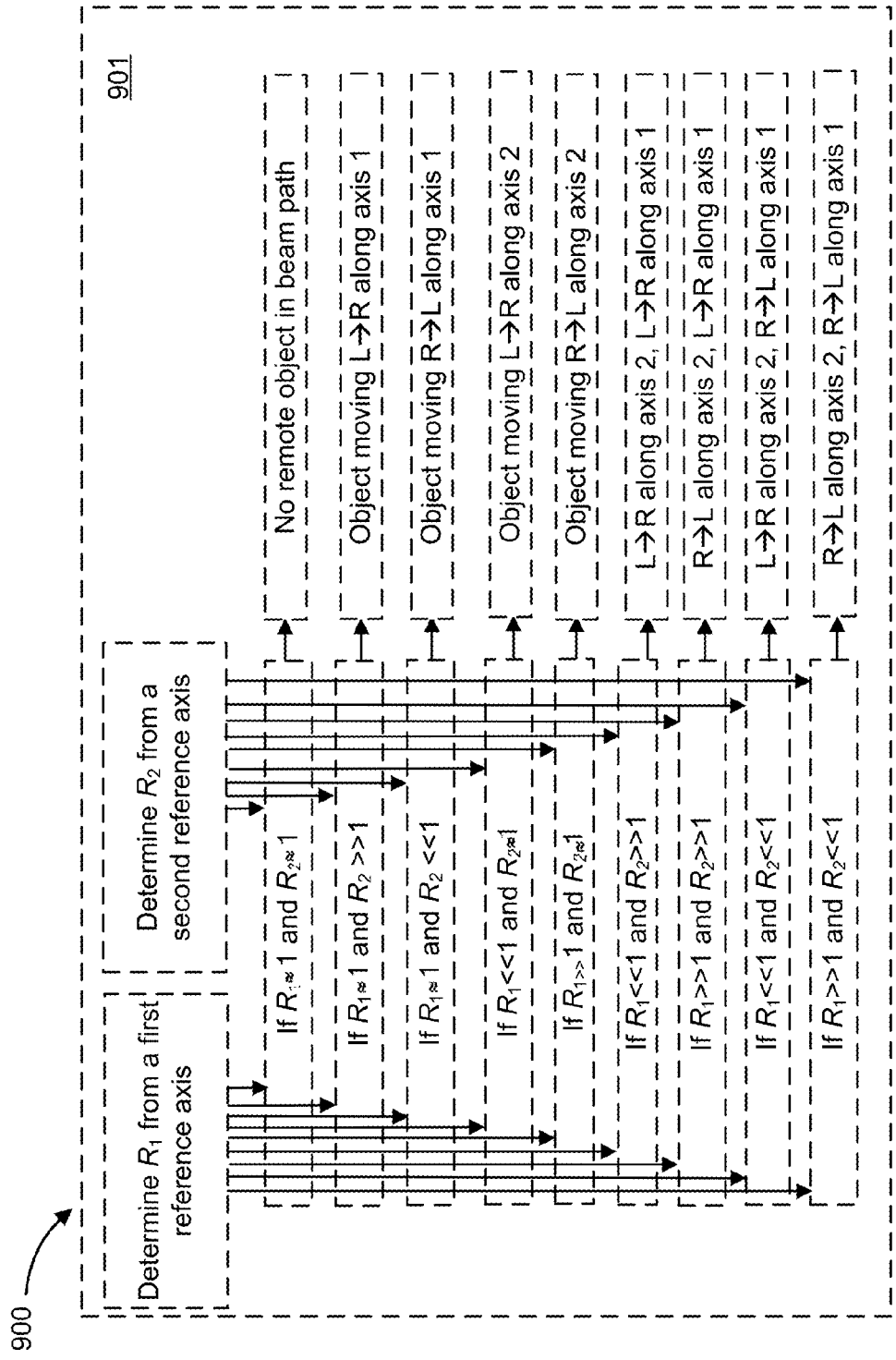
FIG. 9 illustrates an exemplary system for remote sensing using optical orbital angular momentum (OAM)-based spectroscopy for detecting two-dimensional lateral motion of a remote object, in accordance with an embodiment of the present principles.

Now referring to FIG. 9, an exemplary operation performed by a detecting and tracking device 900 including, for example, a processor 901, is illustratively depicted. In an embodiment, each OAM detector (not shown) may determine the power values for each OAM mode in the reflected OAM spectrum, as described above. In accordance with the present principles, the detecting and tracking device 900 may be configured to determine the ratios of power for each reference axis (e.g., $1^{st}$ axis and/or $2^{nd}$ axis) and compare the ratios with reference values of a non-moving remote object to determine lateral motion of the remote object. In an embodiment, the ratios $R_1$ and $R_2$ may be defined as:

$$R_1 = \frac{|a_{1,l=1}(r)|^2}{|a_{1,l=-1}(r)|^2} \quad (1)$$

$$R_2 = \frac{|a_{2,l=1}(r)|^2}{|a_{2,l=-1}(r)|^2} \quad (2)$$

where $|a_{1,l=1}(r)|^2$ and $|a_{1,l=-1}(r)|^2$ denote the power in mode l=1 and l=−1, respectively, measured given a tilt with respect to a first reference axis (e.g., $1^{st}$ axis), and $|a_{2,l=1}(r)|^2$ and $|a_{2,l=-1}(r)|^2$ denote the power in mode l=1 and l=−1, respectively, measured given a tilt with respect to a second reference axis (e.g., $2^{nd}$ axis).

For example, assuming the first reference axis is the x-axis, the second reference axis is the y-axis, and the beam propagates in the z-axis, the detecting and tracking device 900 may determine the lateral motion of a moving remote object, as shown in FIG. 9. In FIG. 9, the symbols ">>" and "<<" denote that a value is substantially bigger or smaller than a reference value, the reference value being determined from the non-moving remote object (e.g., reference case). As shown in FIG. 9, the detecting and tracking device 900 may determine the power ratios along a first reference axis and/or a second axis reference and compare the first ratio and/or second ratio to the reference value to determine lateral motion of the remote object. Accordingly, the detecting and tracking device 900 may be configured to determine left to right (L→R) motion and/or right to left (R→L) motion along a first reference axis and/or second reference axis to determine lateral motion in either one-dimensional motion or two-dimensional motion.

The systems and methods disclosed herein are more efficient both in terms of data storage and data transmission requirements compared to non-compressive high resolution object imaging methods. In addition, the present principles also require minimal post-processing compared to conventional high resolution image processing techniques. Compared to non-OAM LIDAR techniques, such as LIDAR using light's intensity, the present principles obtain laterl motion information and achieve higher spatial imaging resolution. In addition, compared to alternate optical spatial mode techniques (e.g., remote sensing using LP-modes), the present principles is superior in identifying rotational symmetries in objects and enables the generation and detection of a large number of spatial modes much more efficiently, enabling lower cost.

Figure 10:
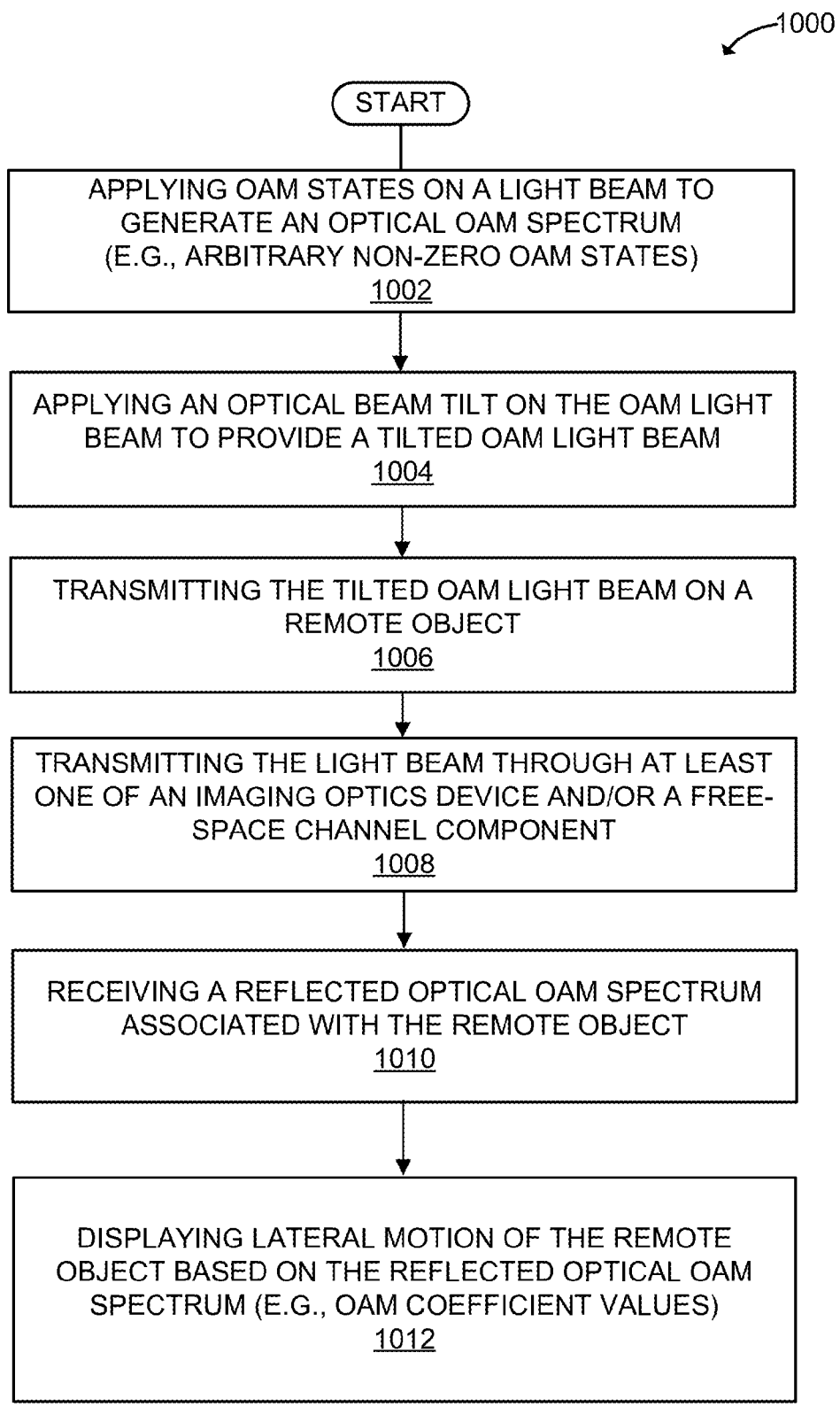
FIG. 10 is a block diagram illustratively depicting an exemplary method for remote sensing using optical orbital angular momentum (OAM)-based spectroscopy for detecting lateral motion of a remote object, in accordance with an embodiment of the present principles.

Now referring to FIG. 10, a method 1000 for OAM-based remote sensing for detecting lateral motion of a remote object is illustratively depicted according to one embodiment of the present principles. Advantageously, the method 1000 may employ optical orbital angular momentum (OAM) on a light beam to obtain lateral motion in both one-dimensional motion and two-dimensional motion in remote sensing systems and to provide effective compressive imaging more efficient than pixel-by-pixel imaging techniques, with the added advantage of having low cost and less complexity. The method 1000 may be performed, for example, by any of system 100 of FIG. 1, system 200 of FIG. 2, system 300 of FIG. 3, system 400 of FIG. 4, system 500 of FIG. 5, system 700 of FIG. 7, and/or system 900 of FIG. 9.

In block 1002, arbitrary OAM states may be applied on a light beam before characterizing the remote object to provide an OAM light beam. In accordance with the present principles, the arbitrary OAM states may include non-zero OAM states.

In block 1004, an optical beam tilt may be applied to the OAM light beam to generate a tilted OAM light beam. For example, the optical beam tilt is a tilt with respect to a reference axis, and the reference axis is orthogonal to a beam axis (e.g., the axis in which the light beam propagates). In some embodiments, the reference axis may include a first and second reference axis (e.g., axis 1, axis 2), and the first reference axis is orthogonal to both the beam axis and the second reference axis. It should be noted that the optical beam tilt may be applied prior to characterizing the remote object by, for example, using a transmitter, however it is contemplated that the optical beam tilt may be applied after characterizing the remote object by, for example, using a receiver.

In one embodiment, the light beam may be transmitted by, for example, a light source device according to various embodiments, and may be directed towards the remote object, as shown in block 1006. The light beam may include a laser beam and may intrinsically have angular momentum.

In block 1008, the tilted OAM light beam may be optionally transmitted through at least one of an imaging optics device and/or free-space channel component. For example, the imaging optics device and/or free-space channel component may include a lens, a plurality of lenses arranged in a series, an amplifier, etc.

In block 1010, the tilted OAM light beam may be projected on the remote object to reflect an optical OAM spectrum, which may be associated with the remote object. The reflected optical OAM spectrum may provide OAM spectra, including power values generated in each OAM mode of the tilted OAM light beam which may be employed to provide lateral motion of the remote object. For example, the OAM spectrum may be measured to extract OAM coefficient values for each OAM mode.

In block 1012, the method 1000 may include displaying lateral motion of the remote object based on the OAM spectrum (e.g., OAM coefficient values, power values, etc.). The power values of the OAM spectra may be compared to provide lateral motion information of the remote object. For example, the power values (e.g., l=1, l=−1) on either side of the OAM launch state values (e.g., l=0) may be analyzed to determine the direction of lateral motion of the remote object, including left to right motion, right to left motion, top to bottom motion, bottom to top motion, or any combination thereof. In some embodiments, it is assumed that a non-moving remote object includes substantially equal power values on either side of the OAM launch mode, as described above with reference to FIG. 6. Accordingly, when a reflected OAM spectrum reflected from a moving remote object is received, lateral motion information may be provided by comparing the power values on either side of the OAM launch mode to determine whether a difference in the power values occurs, thereby indicating lateral motion in at least one dimension. In further embodiments, when multiple OAM detectors are employed such that each OAM detector is configured to detect OAM spectra for each OAM mode and the optical beam tilt provides a tilted OAM light beam with respect to two reference axes, lateral motion information may be provided by comparing the power values on either side of the OAM launch mode to determine whether a difference in the power values occurs, thereby indicating lateral motion in two-dimensional motion.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor, e.g., a hardware processor, coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

It should be noted that while the above configuration is illustratively depicted, it is contemplated that other sorts of configurations may also be employed according to the present principles. These and other variations between configurations are readily determined by one of ordinary skill in the art given the teachings of the present principles provided herein, while maintaining the present principles. Moreover, in one embodiment, at least one of the elements described above is processor-based. Further, while one or more elements may be shown as separate elements, in other embodiments, these elements can be combined as one element. The converse is also applicable, where while one or more elements may be part of another element, in other embodiments, the one or more elements may be implemented as standalone elements. These and other variations of the elements are readily determined by one of ordinary skill in the art, given the teachings of the present principles provided herein.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

What is claimed is:

1. A transmitter for remote sensing using optical orbital angular momentum (OAM)-based spectroscopy for lateral motion detection, the transmitter comprising:
    a light source modulator configured to generate a light beam for imaging a remote object;
    at least one OAM generator to apply at least one OAM mode on the light beam to generate an OAM light beam, the OAM light beam having an optical OAM spectrum; and
    at least one optical beam tilter to apply at least one optical beam tilt on the OAM light beam to generate a tilted OAM light beam, wherein the tilted OAM light beam interacts with the remote object to provide lateral motion associated with the remote object.

2. The transmitter according to claim 1, wherein the at least one OAM mode is an arbitrary non-zero OAM mode.

3. The transmitter according to claim 1, wherein the at least one OAM generator includes at least one of a spatial light modulator, a liquid crystal on silicon spatial light modulator (LCOS-SLM), Q-phase plates, an OAM sorter or a combination thereof.

4. The transmitter according to claim 1, further comprising at least one imaging optics device, the at least one imaging optics devices including at least one of a lens, a plurality of lenses arranged in a series, a microscope objective, free-space optics, or a combination thereof.

5. The transmitter according to claim 1, wherein:
    the OAM light beam propagates on a beam axis and the tilted OAM light beam propagates on a reference axis; and
    the at least one optical beam tilt is a tilt with respect to at least one reference axis, the at least one reference axis being orthogonal to the beam axis.

6. The transmitter according to claim 1, wherein the at least one OAM generator is further configured to receive a reflected OAM spectrum to characterize the lateral motion of the remote object, the reflected OAM spectrum having at least two power values of OAM modes on opposite sides of an OAM launch mode.

7. The transmitter according to claim 6, further comprising a processor to compare the at least two power values to display lateral motion of the remote object based on the reflected OAM spectrum.

8. The transmitter according to claim 7, wherein the lateral motion of the remote object includes at least one of one-dimensional motion and/or two-dimensional motion.

9. A receiver for remote sensing using optical orbital angular momentum (OAM)-based spectroscopy for lateral motion detection, the receiver comprising:
- at least one optical beam tilter to apply at least one optical beam tilt on an OAM light beam to generate a tilted OAM light beam, the titled OAM light beam having a reflected optical OAM spectrum;
- at least one OAM detector configured to receive the reflected OAM spectrum associated with a remote object, the reflected OAM spectrum having at least two power values of OAM modes on opposite sides of an OAM launch mode; and
- a processor to compare the at least two power values to display lateral motion of the remote object based on the reflected OAM spectrum.

10. The receiver according to claim 9, wherein the tilted OAM light beam includes at least one OAM mode, the OAM mode being a non-zero OAM mode.

11. The receiver according to claim 9, wherein the at least one OAM detector includes at least one of a spatial light modulator, a liquid crystal on silicon spatial light modulator (LCOS-SLM), Q-phase plates, an OAM sorter or a combination thereof.

12. The receiver according to claim 9, further comprising at least one imaging optics device, the at least one imaging optics devices including at least one of a lens, a plurality of lenses arranged in a series, a microscope objective, free-space optics, or a combination thereof.

13. The receiver according to claim 9, wherein:
- the OAM light beam propagates on a beam axis and the tilted OAM light beam propagates on a reference axis; and
- the at least one optical beam tilt is a tilt with respect to at least one reference axis, the at least one reference axis being orthogonal to the beam axis.

14. The receiver according to claim 9, wherein the lateral motion of the remote object includes at least one of one-dimensional motion and/or two-dimensional motion.

15. A method for remote sensing using optical orbital angular momentum (OAM)-based spectroscopy for lateral motion detection, comprising:
- applying at least one OAM mode on a light beam to generate an OAM light beam, the OAM light beam having an optical OAM spectrum;
- applying at least OAM optical beam tilt on the OAM light beam to generate a tilted OAM light beam;
- transmitting the tilted OAM light beam on a remote object, such that the remote object interacts with the tilted OAM light beam;
- receiving a reflected OAM spectrum associated with the remote object, the reflected OAM spectrum having at least two power values of OAM modes on opposite sides of an OAM launch mode; and
- displaying lateral motion of the remote object based on the reflected OAM spectrum by comparing the at least two power values.

16. The method according to claim 15, wherein the at least one OAM mode is an arbitrary non-zero OAM mode.

17. The method according to claim 15, wherein:
- the OAM light beam propagates on a beam axis and the tilted OAM light beam propagates on a reference axis; and
- the at least one optical beam tilt is a tilt with respect to at least one reference axis, the at least one reference axis being orthogonal to the beam axis.

18. The method according to claim 15, wherein the lateral motion of the remote object includes at least one of one-dimensional motion and/or two-dimensional motion.

* * * * *